United States Patent
Lee et al.

(10) Patent No.: US 6,810,024 B1
(45) Date of Patent: Oct. 26, 2004

(54) AUTO-DETECTION SYSTEM AND METHOD FOR A NETWORK TRANSCEIVER

(75) Inventors: Jack W. Lee, Sudbury, MA (US); Robert H. Leonowich, Muhlenburg Township Berks County, PA (US); Joseph A. Manzella, Macungie, PA (US); Matthew Tota, Clinton, NJ (US)

(73) Assignee: Agere Systems Inc., Allentown, PA (US)

( * ) Notice: Subject to any disclaimer, the term of this patent is extended or adjusted under 35 U.S.C. 154(b) by 802 days.

(21) Appl. No.: 09/598,525

(22) Filed: Jun. 21, 2000

(51) Int. Cl.$^7$ .................. H04B 1/44; H04L 12/413; H04J 3/16

(52) U.S. Cl. .................. 370/282; 370/445; 370/466

(58) Field of Search ................ 370/276, 282, 370/239, 445, 466, 465; 375/282, 333, 361; 709/228, 230, 250, 221

(56) References Cited

U.S. PATENT DOCUMENTS

| | | | |
|---|---|---|---|
| 4,562,582 A | 12/1985 | Tokura et al. | 375/87 |
| 5,023,891 A | 6/1991 | Johnson, III | 375/87 |
| 5,040,193 A | 8/1991 | Leonowich et al. | 375/87 |
| 5,056,114 A | * 10/1991 | Wight | 375/87 |
| 5,315,270 A | 5/1994 | Leonowich | 331/1 A |
| 6,122,667 A | * 9/2000 | Chung | 709/228 |
| 6,141,352 A | * 10/2000 | Gandy | 370/463 |
| 6,222,852 B1 | * 4/2001 | Gandy | 370/463 |

* cited by examiner

*Primary Examiner*—Duc Ho

(57) ABSTRACT

An auto-detection system and method for a network transceiver that allows the network transceiver to switch from a first rate mode to a second rate mode automatically. In one embodiment, the system includes: (1) an error counter, coupled to a receive input of the network transceiver, that accumulates a count of code violations while the network transceiver is operating in the first rate mode and (2) mode-switching circuitry, coupled to the error counter, that switches the network transceiver to the second rate mode when the count reaches a predetermined value.

31 Claims, 3 Drawing Sheets

AUTO-DETECTION SYSTEM AND METHOD FOR A NETWORK TRANSCEIVER

TECHNICAL FIELD OF THE INVENTION

The present invention is directed, in general, to network adapters and, more specifically, to an auto-detection system and method for a network transceiver that allows the network transceiver to switch from a first rate mode to a second rate mode automatically.

BACKGROUND OF THE INVENTION

The reliable operation of computer systems depends in part on the reliable transfer of data both within a particular system and system to system. Many established formats and standards exist for data transfer; these formats and standards are directed toward particular applications. Manchester encoding is a standard format that may be used to encode both the clock and data of a synchronous bit stream that is being transmitted over a length of interconnecting cable.

In this technique, the actual binary data to be transmitted over the cable is not sent as a sequence of logical ones and zeros. Instead, the bits are translated into a slightly different format that affords a number of advantages over using straight binary encoding. In the Manchester encoding scheme, a logical one is indicated by a zero-to-one transition that occurs at the center of bit boundaries (divisions between adjacent bits). A logical zero is indicated by a one-to-zero transition that also occurs at the center of the bit boundaries. Signal transitions may or may not occur at bit boundaries, but the information-carrying transitions always occur off-boundary. Therefore, any transition that violates these rules may be suspected as a Manchester code violation.

Manchester encoding contains not only the binary information but also a clock signal, which makes Manchester encoding a self-clocking form of encoding. A Digital Phase-Locked Loop (DPLL) may be advantageously employed to decode the binary value and timing of each bit. 10Base-T is a standard protocol that uses Manchester encoding employing a 10 megahertz (MHz) clock frequency. 100Base-TX is another standard protocol used in the transmission of binary data at a much higher frequency, thereby allowing a higher transfer rate of data. The 100Base-TX format does not use Manchester encoding.

Switching between the 10Base-T format and the 100Base-TX format currently requires that the transmitter stop transmitting the 10Base-T data to create a "link down" condition that the receiver can detect. After link down pause and detection, transmission of the 100Base-TX format may begin. If switching occurs before a link down pause, current receivers do not make the transition and therefore lose some or all of the data. Having to pause transmission for a link down causes transmission efficiency to suffer and the system or systems to be unavailable part of the time.

Accordingly, what is needed in the art is a more efficient way to switch transmission modes between 10Base-T and 100Base-TX modes of operation. More generally, what is needed in the art is a more efficient way for a network transceiver to switch from a first rate mode to a second rate mode.

SUMMARY OF THE INVENTION

To address the above-discussed deficiencies of the prior art, the present invention provides an auto-detection system and method for a network transceiver that allows the network transceiver to switch from a first rate mode to a second rate mode automatically. In one embodiment, the system includes: (1) an error counter, coupled to a receive input of the 10/100Base-T transceiver, that accumulates a count of Manchester code violations while the 10/100Base-T transceiver is operating in the 10Base-T mode and (2) mode-switching circuitry, coupled to the error counter, that switches the 10/100Base-T transceiver to the 100Base-TX mode when the count reaches a predetermined value.

The present invention therefore introduces the broad concept of basing mode changes from 10Base-T to 100Base-TX on error accumulations, it being assumed that error accumulations reaching a predetermined level are reasonably attributable to a change of protocol from 10Base-T to 100Base-TX. The present invention enjoys substantial utility in that manual intervention is no longer required to effect a mode change.

In one embodiment of the present invention, the error counter begins to accumulate the count upon assertion of a carrier sense signal and expiration of a predetermined wait time thereafter. Assertion of the carrier sense signal indicates the beginning of a network transmission and the onset of data that can be error-tested. The predetermined wait time (which may be factory-set or user-programmable, as desired) allows the error counter to avoid spurious noise that may be present at the inception of a network transmission.

In one embodiment of the present invention, the predetermined value is at least 16. In a more specific embodiment, the predetermined value is 32. Those skilled in the pertinent art will understand, however, that any value is within the broad scope of the present invention.

In one embodiment of the present invention, assertion of an idle signal causes the error counter to reset the count to zero. The idle signal can be asserted between the transmission of packets on the network. This puts the system in condition to begin a future accumulation and possible mode-change. One skilled in the pertinent art is familiar with packets and transmission of packets on a computer network.

In one embodiment of the present invention, the mode-switching circuitry initiates negotiation when the error counter reaches the predetermined value. For purposes of the present invention, a predetermined value is a value at which it can be determined that the received data rate is at a rate different from the current data rate and the network transceiver should negotiate to the new received data rate. Those skilled in the pertinent art is familiar with negotiation for network communications.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3A illustrates a bit pattern of alternating ones and zeros representing a selection of encoded data;

FIG. 3B illustrates a 10Base-T Manchester waveform representing the selection of encoded data in FIG. 3a;

FIG. 3C illustrates a 100Base-TX multilevel transition waveform representing the selection of encoded data in FIG. 3A.

DETAILED DESCRIPTION

The present invention is directed to an auto-detection system and method for a network transceiver. The system allows the network transceiver to switch from a first rate mode to a second rate mode based upon the system detecting and accumulating a predetermined number of code violations associated with data received over a network while operating in the first rate mode. For the purpose of describing the present invention, the remaining discussion will be directed to one embodiment of the present invention where the network transceiver is a 10/100Base-T transceiver, the first rate mode is 10Base-T and the second rate mode is 100Base-TX.

Figure 1:
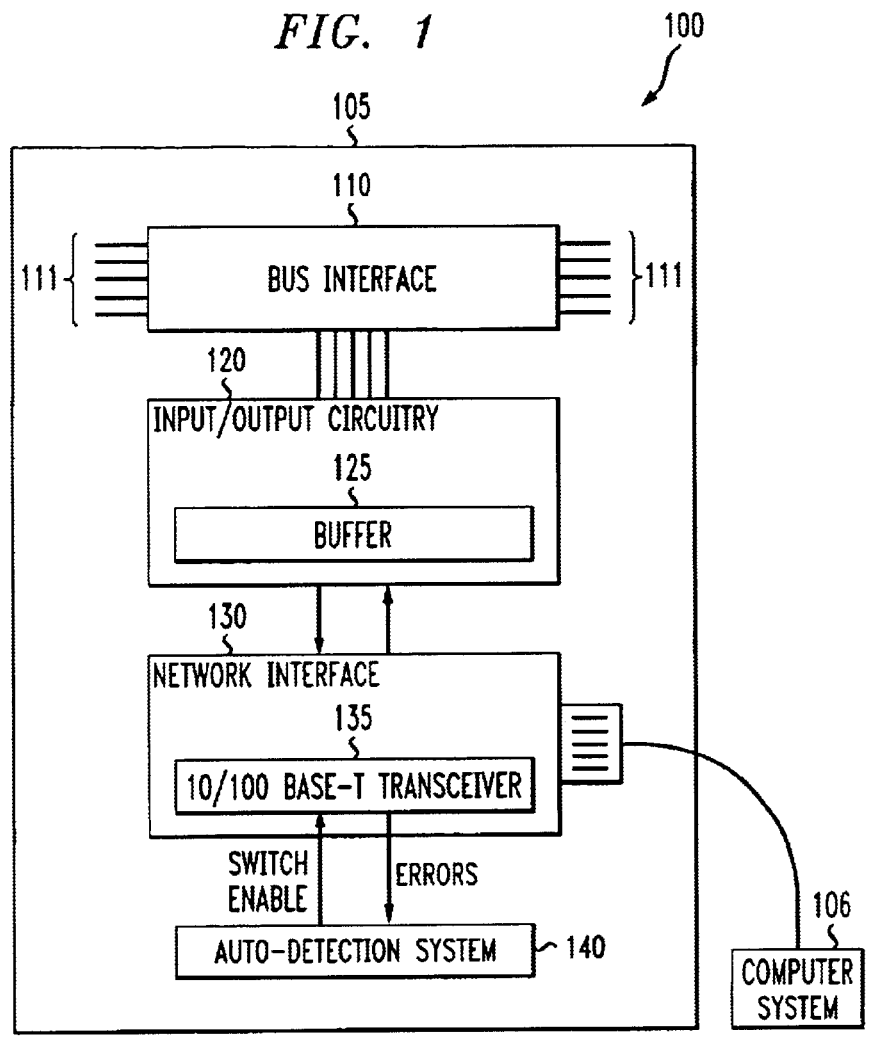
FIG. 1 illustrates a computer network employing an embodiment of a network adapter that incorporates the system or method constructed or carried out according to the principles of the present invention.

Referring initially to FIG. 1, illustrated is a computer network 100 employing an embodiment of a network adapter that incorporates the system or method constructed or carried out according to the principles of the present invention. The network 100 includes a network adapter 105 coupled to a computer system 106, which may be one of a plurality of computer systems in the network 100. The network adapter 105 includes a bus interface 110, coupled to a bus 111 that connects with the plurality of computer systems in the network 100.

The network adaptor 105 further includes an input/output circuitry 120, coupled to the bus interface 110, that is associated with a buffer 125. The network adaptor 105 further includes a network interface 130, coupled to the input/output circuitry 120 and the computer system 106, that is associated with a 10/100Base-T transceiver 135. The network adaptor 105 still further includes an auto-detection system 140, coupled to the network interface 130. The illustrated embodiment of the present invention provides the auto-detection system 140, which incorporates circuitry that allows the 10/100Base-T transceiver 135 to switch from a 10Base-T to a 100Base-TX mode automatically.

The buffer 125 has memory that is given the task of temporarily holding information for the purpose of waiting for the destination device to be able to receive data. Therefore, if the computer system 106 is delayed a few milliseconds before it can accept data, the buffer 125 holds the data until the computer system 106 can accept it. The network interface 130 is the location at which the network adapter 105 can directly connect to the computer system 106. The 10/100Base-T transceiver 135 may transmit data from the computer system 106 to others of the plurality of computer systems via the bus 111. Alternately, the computer system 106 may receive data from the bus 111 via the 10/100Base-T transceiver 135.

In the illustrated embodiment, the auto-detection system 140 is coupled to a receive input of the 10/10Base-T transceiver 135. The auto-detection system 140 accumulates a count of Manchester code violations or errors while the 10/100Base-T transceiver is operating in the 10Base-T mode. When the error count reaches a predetermined value, the auto-detection system 140 switches the 10/100Base-T transceiver 135 to the 100Base-TX mode.

In another embodiment, the auto-detection system 140 initiates negotiation when the error count reaches a predetermined value. Upon successful completion of negotiation, the auto-detection system 140 switches the 10/100Base-T transceiver 135 to the 100Base-TX mode. If negotiation is unsuccessful, the auto-detection system 140 may remain in the 10Base-T mode. One skilled in the pertinent art is familiar with negotiation for network communications.

Figure 2:
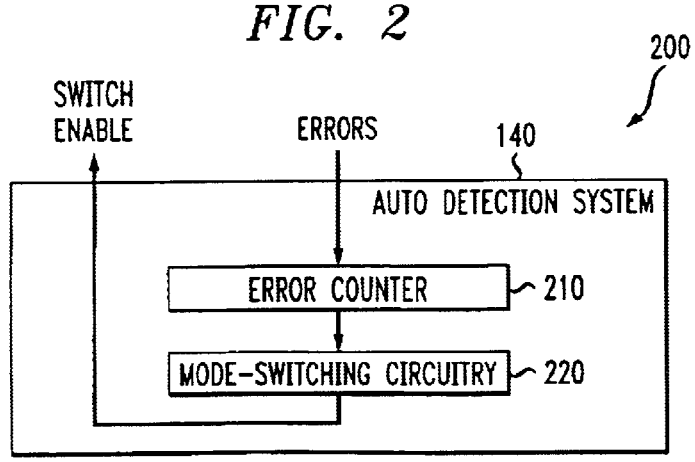
FIG. 2 illustrates a pictorial diagram showing an embodiment of the auto-detection system that allows the 10/100Base-T transceiver of FIG. 1 to switch automatically from a 10Base-T to a 100Base-TX mode.
Figure 4:
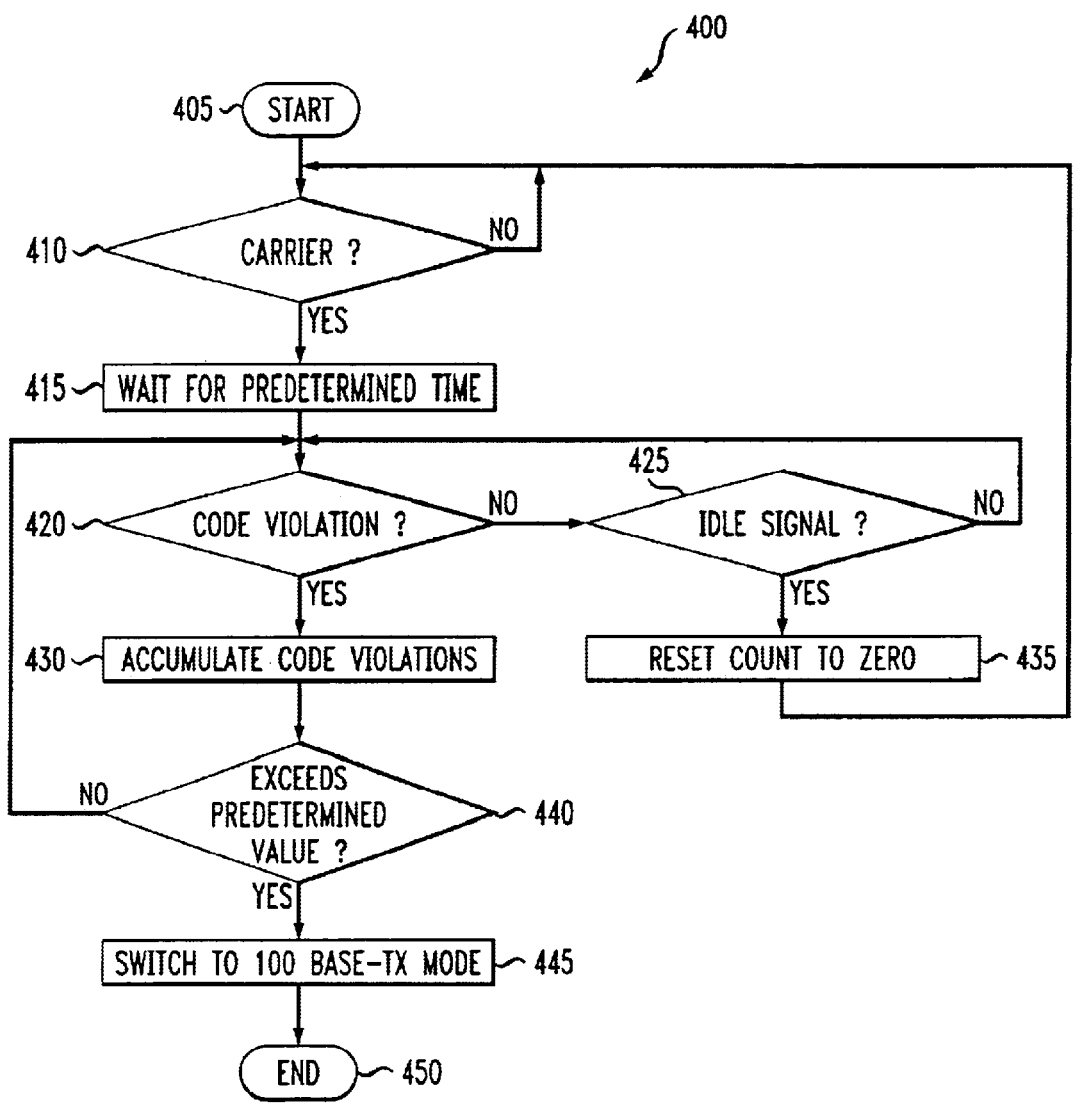
FIG. 4 illustrates a flow diagram showing an embodiment of a method of causing the 10/100Base-T transceiver of FIG. 1 to switch automatically from a 10Base-T to a 100Base-TX mode.

Turning now concurrently to FIGS. 2 and 4, illustrated are a pictorial diagram 200 showing an embodiment of the auto-detection system 140 (FIG. 2) and a flow diagram showing an embodiment of a method 400 (FIG. 4) that cause the 10/100Base-T transceiver 135 of FIG. 1 to switch automatically from a 10Base-T to a 100Base-TX mode. The auto-detection system 140 includes an error counter 210 and a mode-switching circuitry 220.

Generally, the error counter 210, coupled to a receive input of the 10/100Base-T transceiver 135, accumulates a count of Manchester code violations while the 10/100Base-T transceiver 135 is operating in the 10Base-T mode. Then, when the count reaches a predetermined value, the mode-switching circuitry 220 recognizes this value and causes the 10/100Base-T transceiver 135 to automatically switch its operating mode to 100Base-TX. In another embodiment, the transceiver 135 can be any network transceiver that is capable of switching from a first rate mode to a second rate mode. In this embodiment, the network transceiver can accumulate any type of code violations.

More specifically, in the illustrated embodiment, the method 400 to shift operating modes automatically starts in a start step 405 wherein assertion of a carrier sense signal is monitored in a step 410. Assertion of the carrier sense signal indicates the beginning of a network transmission and the onset of data that can be error-tested.

Upon assertion of the carrier sense signal, a predetermined wait time is undertaken in a step 415. The predetermined wait time, which may be factory-set or user-programmable, allows the error counter 210 to avoid spurious noise that may be present at the inception of a network transmission.

Then, the data received by the auto-detection system 140 is monitored for code violations in a step 420. In one embodiment, the code violation is a Manchester code violation. Of course, however, other types of code violations are well within the broad scope of the present invention.

If a code violation occurs, the error counter 210 begins to accumulate a count of code violations in a step 430. If no code violation occurs, monitoring for an assertion of an idle signal begins in a step 425. In one embodiment, an idle signal can be asserted in between the transmission of data packets. If the idle signal is not asserted, the method 400 returns to the step 420 wherein the auto-detection system 140 again monitors for code violations. If the idle signal is asserted, the error counter 210 resets the code violation count to zero in a step 435 wherein assertion of a carrier sense signal is again monitored in the step 410. The error counter 210 is then in a condition to begin a code violation accumulation again.

As code violations accumulate in the error counter 210 during the step 430, the count of code violations is compared to a predetermined value in a step 440. In the illustrated embodiment, the predetermined value is at least 16. In an alternative embodiment, the predetermined value is 32. Those skilled in the pertinent art will understand, however, that any value (power of two or otherwise) is within the broad scope of the present invention. When the number of code violations in the error counter 210 exceed (or equal, in an alternative embodiment) the selected predetermined value in the step 440, the mode-switching circuitry 220 switches the 10/100Base-T transceiver 135 from the 10Base-T mode to the 100Base-TX mode in a step 445, thereby effecting a mode-change.

In another embodiment, the mode-switching circuitry 220 initiates negotiation when the error counter 210 reaches the predetermined value. Upon successful completion of negotiation, the mode-switching circuitry 220 switches the 10/100Base-T transceiver 135 to the 100Base-TX mode. If negotiation is unsuccessful or if the rate mode of the transmitting transceiver has not changed, the mode-switching circuitry 220 may remain in the 10Base-T mode. The error counter 210 resets the count of code violations to zero and the method 400 restarts again with monitoring of an assertion of a carrier sense signal in the step 410. One skilled in the pertinent art is familiar with negotiation for network communications.

When the 10/100Base-T transceiver 135 is in the 100Base-TX mode in the illustrated embodiment, the error counter 210 ignores consecutive pulses that occur within a predetermined period of time of one another to prevent the 10/100Base-T transceiver 135 from erroneously switching back to the 10Base-T mode. In an alternative embodiment, when the 10/100Base-T transceiver 135 is in the 100Base-TX mode, the error counter 210 ignores pulses of alternating polarity to prevent the 10/100Base-T transceiver 135 from erroneously switching back to the 10Base-T mode. Of course, the broad scope of the present invention does not require the error counter to ignore such pulses.

One skilled in the pertinent art should know that the present invention is not limited to 10Base-T and 100Base-TX modes. Nor is the present invention limited to Manchester code violations. In other embodiments, the present invention could switch between any first rate mode and second rate mode based upon detecting code violations.

Figure 3:
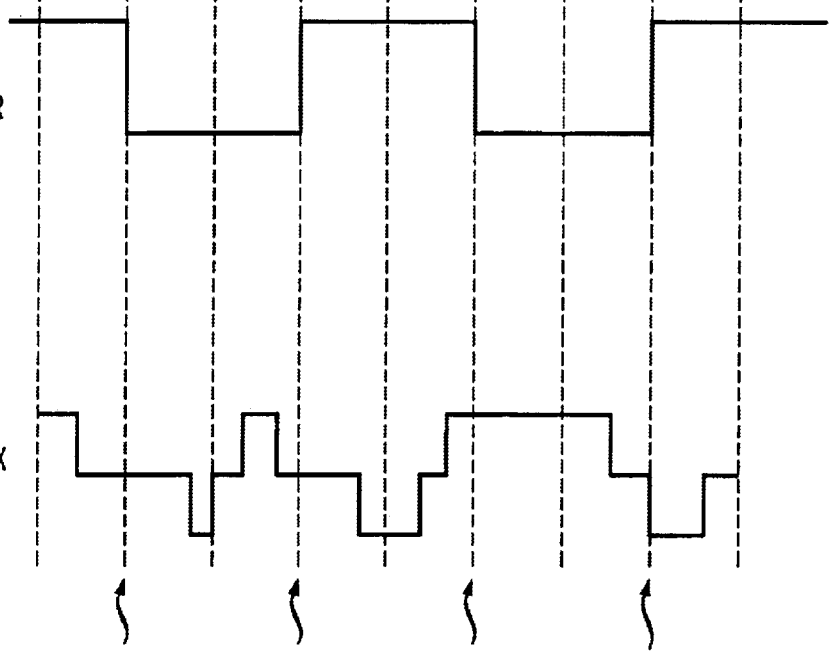

Turning now to FIGS. 3A, 3B and 3C, collectively illustrated is a waveform diagram 300. FIG. 3A illustrates a bit pattern of alternating zeros and ones representing a selection of encoded data. FIG. 3B illustrates a 10Base-T Manchester waveform representing the selection of encoded data in FIG. 3a. FIG. 3C illustrates a 100Base-TX multilevel transition waveform. Waveform time periods for the 10Base-T Manchester waveform of FIG. 3B and the 100Base-TX multilevel transition waveform of FIG. 3C are different.

For the 10Base-T Manchester waveform of FIG. 3B, the Manchester encoding provides bit boundaries that occur every 100 nanoseconds (ns). It may also be noted that the Manchester waveform transitions occur in the middle of the bit boundaries 310, 320, 330, 340. Additionally, Manchester encoding provides a positive transition for a logical one and a negative transition for a logical zero. FIG. 3B illustrates that the alternating bit pattern of FIG. 3A produces a 5 MHz square wave having a 200 ns period. Of course, other bit patterns produce other Manchester waveforms. However, none of the possible bit patterns can produce more than a 10 MHz square wave having a 100 ns period. This waveform occurs for a bit pattern of either all logical ones or all logical zeros.

For the 100Base-TX multilevel transition waveform (MLT3) of FIG. 3C, the waveform employs three levels (-V, 0, +V) to encode the bit pattern. This is in contrast to Manchester encoding, which uses only two levels. Additionally, 100Base-TX (MLT3) provides bit boundaries that may occur every 8 ns; and a logical one produces a level change. For a bit pattern of all logical ones or all logical zeros, alternating positive, null and negative pulses occur. This bit pattern situation provides the fastest line rate of 31.25 MHz having a period of 32 ns.

Since the 100Base-TX multilevel transition waveform has a shorter period than the 10Base-T Manchester waveform of FIG. 3B, the 100Base-TX multilevel transition waveform will cause Manchester coding violations when a receiver is in a 10Base-T mode. For example, on the first three bit boundaries 310, 320, 330, the 100Base-TX multilevel transition waveform will cause Manchester coding violations. Since the 100Base-TX multilevel transition waveform transitions on the fourth bit boundary 340, no Manchester code violation will occur. Of course, however, Manchester code violation for the 100Base-TX multilevel transition waveform can occur at any bit boundary or any number of bit boundaries.

With respect to the reception of a 10Base-T Manchester signal, a 100Base-TX MLT3 signal appears as Manchester code violations for shorter cable lengths. For longer cable lengths, the 100Base-TX signal may alias as a 10Base-T link test pulse. When in a 10Base-T mode, the present invention monitors and counts Manchester code violations. Once a predetermined number of code violations has been reached, operation is shifted from a 10Base-T mode to a 100base-TX mode automatically.

Although the present invention has been described in detail, those skilled in the art should understand that they can make various changes, substitutions and alterations herein without departing from the spirit and scope of the invention in its broadest form.

What is claimed is:

1. For use with a network transceiver, an auto-detection system that allows said network transceiver to switch automatically from a first rate mode to a second rate mode, comprising:
 an error counter, coupled to a receive input of said network transceiver, that accumulates a count of code violations in a data packet while said network transceiver is operating in said first rate mode; and
 mode-switching circuitry, coupled to said error counter, that switches said network transceiver to said second rate mode when said count reaches a predetermined value.

2. The system as recited in claim 1 wherein said error counter begins to accumulate said count upon assertion of a carrier sense signal and expiration of a predetermined wait time thereafter.

3. The system as recited in claim 1 wherein said predetermined value is at least 16.

4. The system as recited in claim 3 wherein said predetermined value is 32.

5. The system as recited in claim 1 wherein assertion of an idle signal or new data packet causes said error counter to reset said count to zero.

6. The system as recited in claim 1 wherein said mode-switching circuitry initiates negotiation when said error counter reaches said predetermined value.

7. For use with a network transceiver, a method of causing said network transceiver to switch automatically from a first rate mode to a second rate mode, comprising:

accumulating a count of code violations at a receive input of said network transceiver while said network transceiver is operating in said first rate mode; and switching said network transceiver to said second rate mode when said count reaches a predetermined value.

8. The method as recited in claim 7 wherein said accumulating is not carried out until assertion of a carrier sense signal and expiration of a predetermined wait time thereafter.

9. The method as recited in claim 7 wherein said predetermined value is at least 16.

10. The method as recited in claim 9 wherein said predetermined value is 32.

11. The method as recited in claim 7 further comprising resetting said count to zero upon assertion of an idle signal.

12. The method as recited in claim 7 wherein said switching further comprises initiating negotiation when said error counter reaches said predetermined value.

13. For use with a 10/100Base-T transceiver, an auto-detection system that allows said 10/100Base-T transceiver to switch automatically from a 10Base-T to a 100Base-TX mode, comprising:

an error counter, coupled to a receive input of said 10/100Base-T transceiver, that accumulates a count of Manchester code violations while said 10/100Base-T transceiver is operating in said 10Base-T mode; and mode-switching circuitry, coupled to said error counter, that switches said 10/100Base-T transceiver to said 100Base-TX mode when said count reaches a predetermined value.

14. The system as recited in claim 13 wherein said error counter begins to accumulate said count upon assertion of a carrier sense signal and expiration of a predetermined wait time thereafter.

15. The system as recited in claim 13 wherein said predetermined value is at least 16.

16. The system as recited in claim 15 wherein said predetermined value is 32.

17. The system as recited in claim 13 wherein assertion of an idle signal causes said error counter to reset said count to zero.

18. The system as recited in claim 13 wherein said mode-switching circuitry initiates negotiation when said error counter reaches said predetermined value.

19. For use with a 10/100Base-T transceiver, a method of causing said 10/100Base-T transceiver to switch automatically from a 10Base-T to a 100Base-TX mode, comprising:

accumulating a count of Manchester code violation at a receive input of said 10/100Base-T transceiver while said 10/100Base-T transceiver is operating in said 10Base-T mode; and switching said 10/100Base-T transceiver to said 100Base-TX mode when said count reaches a predetermined value.

20. The method as recited in claim 19 wherein said accumulating is not carried out until assertion of a carrier sense signal and expiration of a predetermined wait time thereafter.

21. The method as recited in claim 19 wherein said predetermined value is at least 16.

22. The method as recited in claim 21 wherein said predetermined value is 32.

23. The method as recited in claim 21 further comprising resetting said count to zero upon assertion of an idle signal.

24. The method as recited in claim 21 wherein said switching further comprises initiating negotiation when said error counter reaches said predetermined value.

25. A network adapter, comprising:

a bus interface couplable to a bus of a computer system;

input/output circuitry, coupled to said bus interface and including a buffer that contains data to be processed in said network adapter;

a network interface, coupled to said input/output circuitry and couplable to a computer network, that contains a 10/100Base-T transceiver; and an auto-detection system that allows said 10/100Base-T transceiver to switch automatically from a 10Base-T to a 100Base-TX mode, including:

an error counter, coupled to a receive input of said 10/100Base-T transceiver, that accumulates a count of Manchester code violations while said 10/100Base-T transceiver is operating in said 10Base-T mode, and mode-switching circuitry, coupled to said error counter, that switches said 10/100Base-T transceiver to said 100Base-TX mode when said count reaches a predetermined value.

26. The network adapter as recited in claim 25 wherein said error counter begins to accumulate said count upon assertion of a carrier sense signal and expiration of a predetermined wait time thereafter.

27. The network adapter as recited in claim 25 wherein said predetermined value is at least 16.

28. The network adapter as recited in claim 27 wherein said predetermined value is 32.

29. The network adapter as recited in claim 25 wherein assertion of an idle signal causes said error counter to reset said count to zero.

30. The network adapter as recited in claim 25 wherein said mode-switching circuitry initiates negotiation when said error counter reaches said predetermined value.

31. A data receiver adapted to receive at least first data in a first mode and second data in a second mode, the first data having a first data rate and the second data having a second data rate different than the first data rate, the data receiver comprising:

mode-switching circuitry adapted to receive error data, the error data including data for at least a specified period of time indicating whether the data receiver is receiving data at the first data rate or the second data rate;

wherein the data receiver switches between the first mode and the second mode in response to the mode-switching circuitry receiving the error data.

* * * * *